Oct. 2, 1951    H. P. PHILLIPS    2,569,778
PISTON RING
Filed Jan. 6, 1947
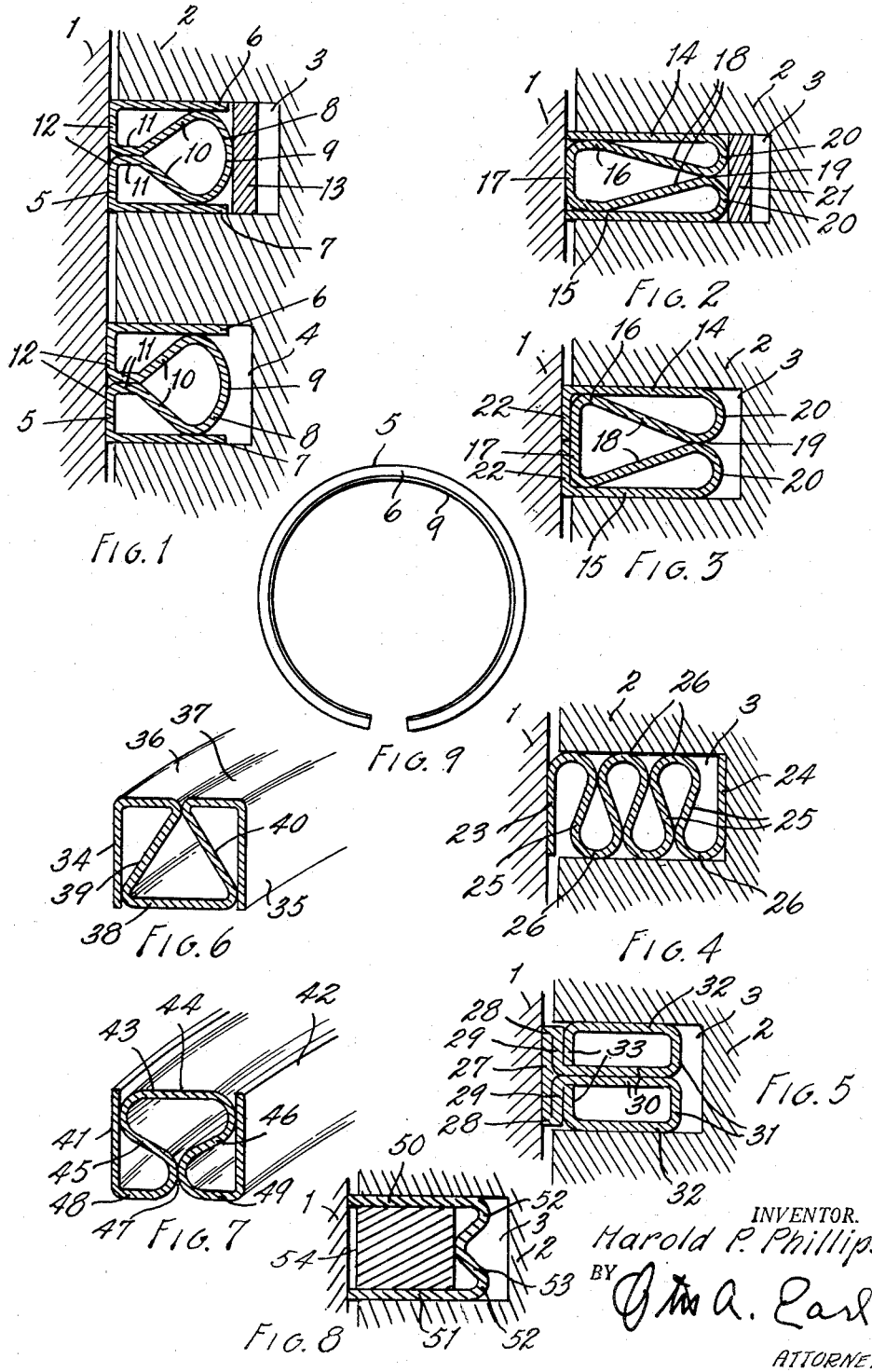
INVENTOR.
Harold P. Phillips
BY
ATTORNEYS.

Patented Oct. 2, 1951

2,569,778

UNITED STATES PATENT OFFICE 2,569,778

PISTON RING

Harold P. Phillips, Hastings, Mich., assignor to Hastings Manufacturing Company, Hastings, Mich., a corporation of Michigan Application January 6, 1947, Serial No. 720,461

11 Claims. (Cl. 309—44)

This invention relates to improvements in piston rings.

The main objects of the invention are:

First, to provide a piston ring element formed entirely of ductile metal which can be readily and economically fabricated and is not likely to be broken or distorted in use.

Second, to provide a piston ring element which efficiently functions as a compression ring and which may be readily fabricated from an integral ductile sheet metal ribbon-like member by folding the same into a plurality of folds or plies extending the full length of the element.

Third, to provide a piston ring element of the type above described which is adapted by a bellows-like action to exert pressure from the inner peripheral wall of a piston ring groove to a cylinder wall.

Objects relating to details and economies of the invention will appear from the description to follow. The invention is pointed out and defined in the claims.

Preferred embodiments of the invention are illustrated in the accompanying drawing in which:

Fig. 1 is a fragmentary section of piston rings embodying the invention installed in assembled relation to a piston and cylinder, the piston and cylinder parts being shown conventionally and without particular regard to dimensions or clearances.

Figs. 2, 3, 4 and 5 are views similar to that of Fig. 1, each showing a different embodiment of the invention.

Figs. 6 and 7 are fragmentary views in perspective and transverse section of ring elements, each ring element constituting a different embodiment of the invention.

Fig. 8 is a view simliar to that of Fig. 1 showing another embodiment of a piston ring assembly.

Fig. 9 is a plan view of a ring element of Fig. 1.

The ring elements of the present application are in respect to the general method of forming the same somewhat similar to those disclosed in Patent No. 2,404,862, in which the ring elements are formed of a flat strip or ribbon of ductile steel or other metal folded longitudinally upon itself into a plurality of integrally connected folds or plies and coiled edgewise into ring shape.

In considering the accompanying drawing, it should be borne in mind that no attempt has been made to show the parts in their relative proportion or where associated with a piston and cylinder to show the clearances and relative dimensions.

Referring to the embodiment of the invention shown in Fig. 1 of the drawing, 1 represents a cylinder wall and 2 a cooperating piston having piston ring grooves 3 and 4 therein. Disposed in the grooves are ring elements, designated generally by the numeral 5, formed of a flat strip or ribbon of ductile steel or other metal folded longitudinally upon itself into a plurality of integrally connected superimposed plies of the shape as shown in cross section in Fig. 1. The folded strip is coiled edgewise into a generally circular shape as shown in Fig. 9 to constitute an expansible split ring element. The relatively thin strip or ribbon of ductile metal is bent to provide the horizontal disposed ring side members 6 and 7 for engaging the upper and lower walls respectively of the ring groove 3, and is bent to provide an intermediate loop-like or folded-over member 8 with the connecting portion or bight 9 thereof disposed generally vertically and between the inner edge portions of the side members 6 and 7 to support the same in spaced relation for engagement with the upper and lower walls of the ring groove 3. The outer edge portions of the arms or side members 10 of the loop-like member 8 are bent towards each other into side by side relation to provide the parallel abutting portions 11 which at their outer edges are bent axially away from each other to provide the vertical cylinder wall engaging portions 12 integrally connected with the side members 6 and 7. The cylinder wall engaging portions 12 are in end abutting relation and securely support the outer edges of the side members 6 and 7 in spaced relation for engagement with the upper and lower walls of the ring groove 3. It will be noted by reference to Fig. 1 of the drawing that the ring element 5 thus formed is of a generally rectangular outline in cross section with the corners, particularly the outer peripheral corners, shaped up substantially squarely. The ring element can be thus shaped in cross section by suitable folding rollers which are not illustrated as they form no part of this invention. In the upper ring groove of the embodiment of Fig. 1, the ring element 5 is engaged by a conventional expander ring 13. This expander is preferably of cast iron as steel is likely to become annealed and lose its tension.

In the embodiment of the invention shown in Fig. 2, the ribbon or strip of ductile metal is bent to provide the side members 14 and 15 and the loop-like or folded over member 16 intermediate the side members. The bight 17 of the loop-like member 16 is vertically disposed between the outer edges of the side members 14 and 15 to securely support the same in spaced relation for engagement with the upper and lower walls respectively of the ring groove 3. The side members 18 of the loop-like member 16 extend radially inwardly and towards each other into supporting abutting engagement with each other at 19 and are then bent axially away from each other providing the substantially vertically extending portions 20 integrally connected to the inner edges of the side members 14 and 15 to securely support these inner edges in spaced relation. This ring element may be used with or without the inner expander element 21.

In the embodiment of the invention shown in Fig. 3 the outer edges of the side members 14 and 15 are bent axially towards each other to provide the cylinder wall engaging portions 22 which are in end abutting relation to each other and in side abutting relation to the connecting portion or bight 17 of the centrally disposed loop-like member 16. The ring element of Fig. 3 is otherwise similar to that of the embodiment of Fig. 2.

In the embodiment of Fig. 4 the strip or ribbon of ductile metal is bent to provide outer and inner vertically extending members 23 and 24 and an intermediate series of vertically extending loop-like or folded members 25. The outer vertical member 23 constitutes a cylinder wall engaging member and the inner member 24 engages the inner peripheral wall of the ring groove 3 and transmits pressure from said inner peripheral wall of the ring groove and the series of loops 25 and cylinder wall engaging member 23 to the cylinder wall 1. The loops or folded members 25 are disposed in a bellows-like formation and transmit pressure with a bellows-like action from the inner vertical wall 24 to the outer cylinder wall engaging member 23. The connecting portions 26 at the opposite ends of the loops 25 engage the upper and lower walls of the ring groove 3. Each bight or connecting portion 26 of a loop 25 on each side of the ring element extends continuously in a plane the full length of the ring element to provide continuous engagement with a side wall of the ring groove throughout the length of the ring element.

In the embodiment of the invention shown in Fig. 5, the strip or ribbon of ductile metal is bent to provide a vertical cylinder wall engaging member 27 which is bent radially inwardly at its upper and lower edges to provide the end portions 28 which are bent axially towards each other to provide the vertical portions 29 in side abutting relation to the cylinder wall engaging member 27. The vertical portions 29 extend to end abutting relation and are then bent radially inwardly in side abutting relation to provide the horizontal radially inwardly extending portions 30 which at their inner ends extend axially away from each other to provide the vertical aligned portions 31 which at their outer ends extend radially outwardly to provide the ring side members 32 for engaging the upper and lower side walls of the ring groove 3. The side members 32 at their outer ends extend axially towards each other providing the vertically aligned tongue members 33 which are in end abutting relation to the horizontal portions 30 and in side abutting relation to the vertical portions 29.

In the embodiment of the invention shown in Fig. 6, the strip or ribbon of ductile metal is bent to provide a vertical cylinder wall engaging member 34, a vertical inner peripheral member 35, horizontal upper side members 36 and 37 in end abutting relation, a lower side member 38 and diagonally disposed bracing members 39 and 40 extending from the abutting ends of the upper side members 36 and 37 to the opposite edges of the lower side member 38. The upper side members 36 and 37 engage the upper wall of a ring groove, and the lower side member 38 engages the lower wall of the ring groove. The edges of the lower side member supportingly engage the lower portions of the cylinder wall engaging member 34 and the inner peripheral member 35. The members 38, 39 and 40 together constitute a loop-like or folded over member disposed between the cylinder wall engaging member 34 and the inner peripheral member 35, and the member 38 constitutes the bight or connecting portion of the loop-like member.

In the embodiment of Fig. 7, the ribbon of metal is bent to provide the vertical cylinder wall engaging member 41, the vertical inner peripheral member 42 and the intermediate loop-like or folded member 43. The bight 44 of the loop 43 constitutes the upper side member of the ring element. The side members 45 and 46 of the loop 43 are bent towards each other into supporting engagement with each other at 47 and then extend radially away from each other to provide the horizontally aligned side members 48 and 49 for engagement with the lower wall of a ring groove.

In the embodiment of Fig. 8, the ribbon of ductile steel is bent to provide the upper and lower side members 50 and 51 and the intermediate connecting portion 52 which is bent radially outwardly to provide a rib-like member 53. A split cast iron ring element 54 is disposed between the side members 50 and 51 to support them in spaced relation. The rib-like member 53 and the cast iron ring element 54 supportingly engage each other.

In each of the embodiments of the invention shown and described, it should be noted that each of the opposite side wall portions of the ring element as is common in compression rings, extends continuously in a plane the full length of the ring element to provide continuous engagement with the upper and lower side walls of the ring groove throughout the length of the ring element.

In the various embodiments of the ring element of ductile metal it will be noted that no part of the ring element is cut away, with the result that the element has uniform strength and tension from end to end. It is not subject to breakage or likely to be permanently distorted in manipulations to install the same. It is made of quite thin stock and consequently may be quite readily bent or shaped to present a relatively sharp edge to the cylinder wall and at the same time the cylinder wall engaging member is supported close to the edges thereof so as not to distort or vibrate in use.

I have illustrated and described practical embodiments of the invention. I have not attempted to illustrate or describe other embodiments or adaptations as it is believed this disclosure will enable those skilled in the art to embody or adapt the invention as may be desired.

Having thus described my invention, what I claim as new and desire to secure by Letters Patent, is:

1. A split resilient piston ring element formed of an integral ductile sheet metal ribbon-like member folded to provide parallel upper and lower side walls for engaging the upper and lower walls of a piston ring groove, and to provide a loop-like member intermediate said side walls, the bight of said loop-like member being disposed between the inner edge portions of said side walls and supportingly retaining the same in spaced relation, the side members of the loop-like member projecting radially outwardly and into abutting side by side relation adjacent their outer edges, said outer edges being provided with portions projecting axially away from each other and integrally connected to the outer edges of the side walls to supportingly retain the same in spaced relation, said axially projecting portions being disposed at right angles to the planes of the side walls and constituting cylinder wall engaging members.

2. A split resilient piston ring element formed of an integral ductile sheet metal ribbon-like member folded to provide parallel upper and lower side walls for engaging the upper and lower walls of a piston ring groove, and to provide a loop-like member intermediate said side walls, the bight of said loop-like member being disposed between the inner edge portions of said side walls and supportingly retaining the same in spaced relation, the side members of the loop-like member projecting radially outwardly and into abutting side by side relation adjacent their outer edges, said outer edges being provided with portions projecting axially away from each other and integrally connected to the outer edges of the side walls to supportingly retain the same in spaced relation, said axially projecting portions constituting cylinder wall engaging members.

3. A split resilient piston ring element formed of an integral ductile sheet metal ribbon-like member folded to provide parallel side walls for engaging the upper and lower walls of a piston ring groove and to provide a loop-like member having side members and an axially disposed connecting portion, said connecting portion being dispsed at right angles to the planes of the side walls and supportingly retaining the outer edge portions of the side walls in spaced relation, said side members projecting radially inwardly from the connection portion, the inner edge portions of said side members being in side by side abutting relation and provided with portions projecting axially away from each other and integrally connected to the inner edges of the side walls and supportingly retaining the inner edges of the side walls in spaced relation.

4. A split resilient piston ring element formed of an integral ductile sheet metal ribbon-like member folded to provide parallel side walls for engaging the upper and lower walls of a piston ring groove and to provide a loop-like member having side members and an axially disposed connecting portion, said connecting portion being disposed at right angles to the planes of the side walls and supportingly retaining the outer edge portions of the side walls in spaced relation, said side members projecting radially from the connection portion, the inner edge portions of said side members being provided with portions projecting axially away from each other and integrally connected to the inner edges of the side walls and supportingly retaining the inner edges of the side walls in spaced relation.

5. A split resilient piston ring element formed of an integral ductile sheet metal ribbon-like member folded to provide parallel side walls for engaging the upper and lower walls of a piston ring groove and to provide a loop-like member having side members and an axially disposed connecting portion, said connecting portion being disposed at right angles to the planes of the side walls and supportingly retaining the outer edge portions of the side walls in spaced relation, said side members projecting radially inwardly from the connection portion, the inner edge portions of said side members being in side by side abutting relation and provided with portions projecting axially away from each other and integrally connected to the inner edges of the side walls and supportingly retaining the inner edges of the side walls in spaced relation, the outer edges of the side walls having portions extending axially towards each other into end abutting relation, the last named axially projecting portions constituting cylinder wall engaging members.

6. A split resilient piston ring element formed of an integral ductile sheet metal ribbon-like member coiled to a ring-like shape and bendably folded along lines extending longitudinally of the member to provide concentric outer and inner walls, and to provide loop-like members concentric to and intermediate said inner and outer walls, the outer wall constituting a cylinder wall engaging member and the inner wall being disposed for engagement with the inner peripheral wall of a piston ring groove, the bights of the loop-like members being disposed to engage the opposite side walls of a piston ring groove, said loop-like members being of a bellows-like formation and disposed to transmit pressure from the inner wall to the outer wall with a bellows-like action.

7. A split resilient piston ring element formed of an integral ductile sheet metal ribbon-like member bendably folded along lines extending longitudinally of the member to provide concentric outer and inner walls, and to provide loop-like members concentric to and intermediate said inner and outer walls, the outer wall constituting a cylinder wall engaging member, the bights of the loop-like members being disposed to engage the opposite side walls of a piston ring groove.

8. A split resilient piston ring element formed of an integral ductile sheet metal ribbon-like member folded to provide a wall for engaging a cylinder throughout substantially the axial dimensions of the ring element, axially spaced and oppositely disposed side wall portions to engage the opposite side walls of a piston ring groove, and a connecting portion integral with the side wall portions for supporting said side wall portions in spaced relation at a distance substantially radially inwardly from said cylinder engaging wall, each of said oppositely disposed side wall portions being radially continuous from the inner periphery of the ring element to closely adjacent said cylinder engaging wall, each oppositely disposed side wall portion extending continuously in a plane the full length of the ring element to provide continuous engagement with a side wall of the ring groove throughout the length of the ring element, the sheet metal ribbon-like member being integrally continuous between the opposite longitudinal edges of the member and being coiled to a ring-like shape and bendably folded along lines extending longitudinally of the ribbon-like member to provide said cylinder engaging wall, axially spaced side wall portions and connecting portions for supporting the side wall portions in spaced relation.

9. A split resilient piston ring element formed of an integral ductile sheet metal ribbon-like member folded to provide a wall for engaging a cylinder throughout substantially the axial dimensions of the ring element, axially spaced and oppositely disposed side wall portions to engage the opposite side walls of a piston ring groove, and a connecting portion integral with the side wall portions for supporting said side wall portions in spaced relation at a distance substantially radially inwardly from said cylinder engaging wall, the sheet metal ribbon-like member being integrally continuous between the opposite longitudinal edges of the member and being coiled to a ring-like shape and bendably folded along lines extending longitudinally of the ribbon-like member to provide said cylinder engaging wall, axially spaced side wall portions and connecting portions for supporting the side wall portions in spaced relation.

10. A split resilient piston ring element formed in its entirety of an integral ductile sheet-metal ribbon-like member folded to provide opposed parallel walls spaced the same distance from each other throughout the circumference of the ring element and folded to provide a loop-like member disposed between said opposed parallel walls, the loop-like member having spaced side members and a portion connecting said side members, the side members adjacent the connecting portion being spaced from each other, the connecting portion engagingly retaining said opposed parallel walls in spaced relation from each other throughout the circumference of the ring element, the side members of said loop like member extending integrally from corresponding edges of said opposed parallel walls towards each other into engagement with each other and bracingly supporting said edges in spaced relation from each other, said ring element having a cylinder wall engaging surface throughout substantially the axial dimensions of the ring element.

11. A split resilient piston ring element of a generally rectangular outline in cross section and including oppositely disposed side walls to engage the opposite side walls of a piston ring groove and a wall for engaging a cylinder throughout substantially the axial distance between said side walls, said ring element in its entirety being formed of an integral ductile sheet-metal ribbon-like member bendably folded along lines extending longitudinally of the member to provide said side and cylinder engaging walls and to provide means separate from said cylinder engaging wall for bracingly spacing the side walls from each other inwardly from the cylinder engaging wall.

HAROLD P. PHILLIPS.

REFERENCES CITED

The following references are of record in the file of this patent:

UNITED STATES PATENTS

| Number | Name | Date |
|---|---|---|
| 1,445,020 | Johnson | Feb. 13, 1923 |
| 2,239,376 | Smith | Apr. 22, 1941 |
| 2,273,691 | Bowers | Feb. 17, 1942 |
| 2,317,580 | Bauer | Apr. 27, 1943 |
| 2,404,862 | Phillips | July 30, 1946 |

FOREIGN PATENTS

| Number | Country | Date |
|---|---|---|
| 484,610 | Germany | Oct. 22, 1929 |
| 182,790 | Switzerland | Feb. 29, 1936 |
| 855,790 | France | May 20, 1940 |